United States Patent [19]

Russell et al.

[11] Patent Number: 6,084,873
[45] Date of Patent: Jul. 4, 2000

[54] METHOD FOR BYPASSING TELEPHONE NETWORK

[75] Inventors: Steven P. Russell, Menlo Park; James E. Dunn, Escondido; Donald M. Bellenger, Los Altos Hills, all of Calif.

[73] Assignee: 3Com Corporation, Santa Clara, Calif.

[21] Appl. No.: 08/819,874

[22] Filed: Mar. 18, 1997

[51] Int. Cl.[7] .................................................. H04M 11/00
[52] U.S. Cl. ........................ 370/352; 379/93.14; 375/222
[58] Field of Search ................................... 370/352, 353, 370/354, 355, 356; 379/93.14; 375/222

[56] References Cited

U.S. PATENT DOCUMENTS

| | | | |
|---|---|---|---|
| 5,237,561 | 8/1993 | Pyhalammi | 370/29 |
| 5,428,608 | 6/1995 | Freeman et al. | 370/60.1 |
| 5,610,910 | 3/1997 | Focsaneanu et al. | 370/351 |
| 5,668,857 | 9/1997 | McHale | 379/93.07 |
| 5,719,901 | 2/1998 | Le Riche et al. | 375/222 |
| 5,751,706 | 5/1998 | Land et al. | 370/352 |
| 5,784,683 | 7/1998 | Sistanizadeh et al. | 455/5.1 |
| 5,805,587 | 9/1998 | Norris et al. | 370/352 |
| 5,809,128 | 9/1998 | McMullin | 370/352 |
| 5,889,774 | 3/1999 | Mirashrafi et al. | 370/352 |

OTHER PUBLICATIONS

Patrick, Dennis R., "The Telecommunications Act of 1996: Impact and Implications", from website http://www.pff.org/pff/cad/patr051496.html, printed Apr. 29, 1997, 8 pages.

Massey, Tim et al., "DSP Solutions for Telephony and Data/Facsimile Modems" Application Book, Texas Instruments SPRA073, copyright Texas Instruments, Inc., Jan. 1997, pp. 1–102.

"Procedures for Document Facsimile Transmission In The General Switched Telephone Network", Fascicle VII.3–Rec. T.30, former Recommendation T.4, mar del Plata, 1968; amended and renumbered at Geneva, 1976 and 1980, Malaga–Torremolinos, 1984 and Melborne, 1988.

ANSI Technical Publication T1.413–1995, "Network and Customer Installation Interfaces—Asymmetric Digital Subscriber Line (ADSL) Metallic Interface", approved Aug. 18, 1995, copyright Amercian National Standards Institute, Inc., New York, 1995, pp. 1–166.

(List continued on next page.)

*Primary Examiner*—Huy D. Vu
*Assistant Examiner*—Dung Trinh
*Attorney, Agent, or Firm*—David J. Weitz; Wilson, Sonsini Goodrich & Rosati

[57] ABSTRACT

The present invention allows telephone subscriber loops carrying data traffic between computer systems to be switched to an alternative connection through a data network, thereby unloading data traffic from the telephone network. The invention operates by means of a break switch, which selectively switches a plurality of subscriber loops between a central office switching system and a data network. The break switch is coupled to a concentrator which takes a plurality of inputs from the break switch and connects them to a smaller number of modems in a modem pool. The concentrator allows a subscriber line to connect to different types of modems within the modem pool, depending upon requirements of a particular subscriber line user. The modem pool connects through a network interface to a packet-switched network, such as the Internet. A number of different methods can be used to transmit a command to switch a subscriber loop from the central office switching system to the packet-switched network. A loop current detector, which is coupled between the plurality of subscriber loops and the break switch, can monitor on/off hook status of the subscriber loop in order to determine whether to switch the connection to the data network. Alternatively, the command to perform the switching can originate from a remote host which transmits the command through the data network to the break switch.

25 Claims, 6 Drawing Sheets

OTHER PUBLICATIONS

SGS–Thomson Microelectronics Technical Publication ST7544, Universal Modem Analog Front–End (UMAFE), published Jun. 1995, pp. 1–50.

Brownlie J., "Draft Text of Recommendation V.8 (V .id) Proposed for Resolution 1, Point 8 Application at the Coming Study Group 14 Meeting in Jun. 1994", International Telecommunications Union COM 14–10E, Mar. 1994, 10 pages.

Hawley, George T., "Systems Considerations for the Use of xDSL Technology for Data Access", IEEE Communications Magazine, Mar. 1997, pp. 56–60.

Forney, G. D., "The V .34 High–Speed Modem Standard", IEEE Comm. Magazine, Dec. 1996, pp. 28–33.

Stuart, R.L., International Telecommunications Union, Temporary Document 57–E, "Clean Final Draft of Recommendation V. 34", Geneva, 1–9 Jun. 1994, pp. 1–70.

METHOD FOR BYPASSING TELEPHONE NETWORK

RELATED APPLICATION

This application hereby incorporates by reference a related non-provisional application, entitled "Subscriber Loop Bypass Modem," by the same inventors, Donald M. Bellenger, James E. Dunn and Steven P. Russell, having Ser. No. 08/819,873, and filing date Mar. 18, 1997, which was filed on the same day as the instant application.

BACKGROUND

1. Field of the Invention

The present invention relates to systems for connecting telephone subscriber lines to computer networks, and more particularly to a system for switching a telephone subscriber line from a telephone central office switching system to a computer network.

2. Related Art

With the advent of computer networking and personal computers, public switched telephone networks (PSTNs) are increasingly used to connect computer systems to other computer systems, and to connect computer systems to computer networks, such as the Internet. This creates performance problems for PSTNs, because telephone line usage patterns for communications between computer systems are fundamentally different from telephone line usage patterns for voice connections. One problem arises because computer data calls often last much longer than voice calls, and telephone switching equipment cannot distinguish a data call from a voice call. Consequently, voice calls may be blocked due to the long holding times of data calls. Furthermore, data calls do not use the voice bandwidth efficiently. Most of the time, a data connection is not actually sending data, it is simply reserving the connection in case it might use it.

PSTNs are designed to maximize trunking efficiency when only a small percentage of possible connections are in actual use at a given instant. Voice telephone calls typically last about three minutes, and during this time a guaranteed data transfer rate must be sustained. In contrast, communications between computer systems, for example email, do not require a continuous transfer rate; interruptions in the flow of data which would render speech signals unintelligible are acceptable for many computer communications.

Furthermore, existing PSTNs were designed assuming a lengthy set up time followed by a large amount of voice data being transferred. These assumptions do not work well for computer connections, where many smaller data transfers are spread out through a longer session. The call set up time in a PSTN is very long relative to the length of the individual data transfers. In order to minimize latency caused by call set up time, most computer users leave their telephone connections off hook for the entire time of the session, which may last several hours. This problem is amplified by the fact that PSTNs typically bill a flat rate for residential services. Hence, there is no time-based cost for lengthy data connections, and no incentive to limit connection time.

As PSTNs are increasingly used to support data calls between computer systems, the long session times for data calls often degrades the performance of PSTNs. There is a problem with "switch holding time." PSTN switches are designed for an average three minute holding time of a voice call. While data calls last much longer, averaging about eighteen minutes. The result is that switches begin to block because of the long-lived data connections, and additional calls cannot be completed. This blocking unfortunately applies to all calls. Hence, ordinary voice telephone calls cannot be completed because they are blocked by data calls.

One solution to this problem is to design a system around a device known as a POTS (Plain Old Telephone Service) splitter, which splits a signal on a telephone subscriber loop into two pieces; a higher-frequency data component which is routed through a data network, and a lower-frequency voice component which is routed through a central office switching system. However, a POTS splitter cannot separate lower-frequency voice band modem signals from ordinary voice signals in order to route them through a data network.

What is needed is an efficient method of separating data calls from voice calls, so that data calls may be switched from a PSTN to a data network.

SUMMARY

The present invention provides an architecture and a method for switching a data call from a PSTN to a data network. In one embodiment, this switching is activated by a telephone line user, before a connection is made through a telephone central office switching system. In another embodiment, this switching is activated by a network service provider after a connection to the network service provider is established through a telephone central office switching system. The present invention allows lower-frequency voice band modem connections to be transferred to the data network as well as higher frequency broad band modem connections.

Thus, the present invention can be characterized as a method for switching a subscriber loop between a central office switching system and a packet-switched network by: establishing a connection between the subscriber loop and a switch; receiving a command to switch the subscriber loop to the packet-switched network; and switching the subscriber loop to the packet-switched network.

According to one embodiment of the present invention, a control signal to switch the subscriber loop is generated in response to a signal received through the subscriber loop. This signal is encoded in the loop current of the subscriber loop, and more particularly in the on/off hook status of the subscriber loop. "Off hook" refers to the flow of direct current as the result of a telephone battery being applied to a telephone instrument's reduced ohmic impedance in an active voice transmission state. "On hook" refers to the absence of direct current flow from the telephone battery when the telephone instrument is in a high impedance idle state.

In another embodiment of the present invention, the control signal is generated in response to a telephone number dialed into the subscriber loop. This telephone number may be in the form of a dual tone multiple frequency (DTMF) signal, or a pulse dialing signal on the subscriber loop.

According to another aspect of the present invention, the switch control signal is generated in response to a signal received through the central office switching system. This signal may originate from the central office switching system itself, or alternatively from a remote host which transmits the control signal to the switch through the central office switching system.

The present invention can also be characterized as an apparatus for switching a plurality of subscriber loops between a central office switching system and a packet-switched network comprising: a network interface coupled to the packet-switched network; a plurality of modems coupled to the network interface; and a first switch coupled to the plurality of subscriber loops, the central office system, and the plurality of modems, for switching the subscriber loops between the central office switching system and the plurality of modems.

According to another aspect of the present invention, the apparatus further includes a second switch coupled between the first switch and the plurality of modems comprising: a plurality of first switch interfaces coupled to the first switch; a plurality of modem interfaces coupled to the plurality of modems; and a switching channel for selectively coupling first switch interfaces to modem interfaces. In one embodiment, there are more first switch interfaces than modem interfaces, so that the second switch performs a concentration function by switching a number of subscriber lines into a smaller number of modems.

The present invention can also be characterized as an apparatus for switching signals onto subscriber loops between a central office switching system and a packet-switched network, comprising: a first port coupled to a subscriber loop; a second port coupled to the central office switching system; a third port coupled to the packet-switched network; and a switch coupled to the first port, the second port and the third port, the switch responding to a control signal to switch the first port between the second port and the third port.

The present invention has a number of advantages. It effectively off loads long-lived data connections from a PSTN onto a data network. In doing so, it concentrates a number of subscriber loops into a smaller number of modems which connect to the data network, so that a smaller number of modems can service a larger number of telephone subscriber loops. The present invention also allows telephone subscriber loops to be connected to a variety of different modem types, depending upon which modem type is required by a data user on a subscriber loop.

DESCRIPTION

The following description is presented to enable any person skilled in the art to make and use the invention, and is provided in the context of a particular application and its requirements. Various modifications to the preferred embodiment will be readily apparent to those skilled in the art and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
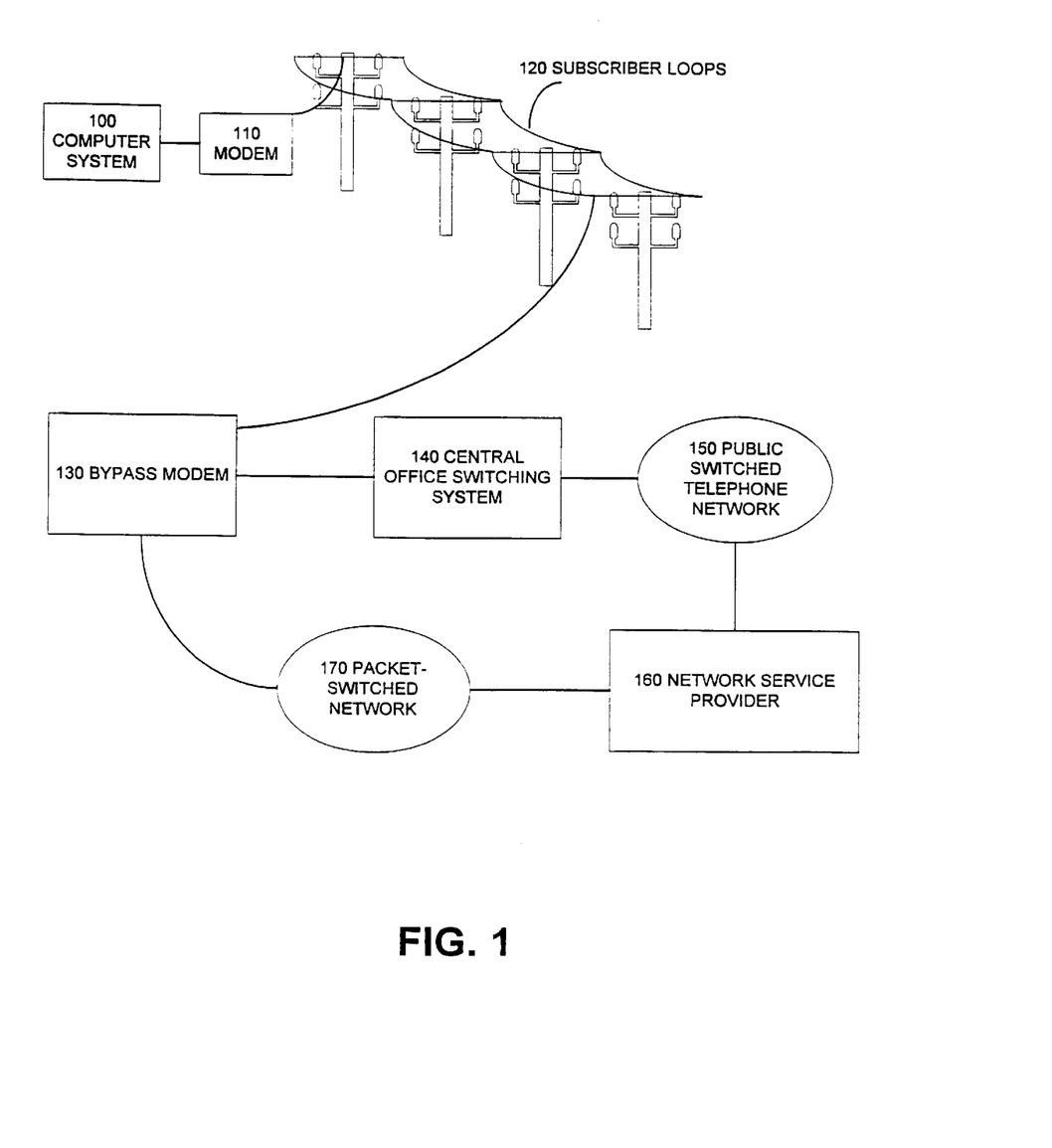
FIG. 1 is a block diagram illustrating how the bypass modem 130 of the present invention connects subscriber loops 120 to central office switching system 140 and packet-switched network 170 according to an aspect of the present invention.

FIG. 1 illustrates how subscriber loops 120 connect through bypass modem 130 to central office switching system 140 and packet-switched network 170 in accordance with an aspect of the present invention. FIG. 1 includes computer system 100, which is any type of computer system capable of receiving and transferring data. This includes computer systems as diverse as personal computers, main frame computers, and embedded system controllers.

Computer system 100 connects to modem 110. Modem 110 is any type of modem, including a high frequency broad band modem, such as a DSL, ADSL, xDSL, HDSL, SDSL or VDSL modem. Modem 110 can also be a lower frequency voice band modem, such as a v.34 or other voice band modem. Voice communications typically occupy a frequency range of 300–3,400 Hz; signals approximately in this frequency range are referred to as "voice band" signals. Higher-frequency signals, up to approximately 1 MHz, are referred to as "broad band" signals. Computer data calls are typically modulated on a carrier frequency. In the case of voice band modem communications, this carrier frequency is a lower-frequency voice band signal. In the case of broad band modem communications, this carrier frequency is a higher-frequency broad band signal. In contrast, regular voice signals are typically not modulated on a telephone subscriber loop.

In another embodiment, modem 110 follows the v.34 standard, but has a symbol rate in excess of the symbol rate specified in the v.34 standard. In a variation of this embodiment, modem 110 is implemented with a digital signal processor running code to implement the v.34 standard, with a symbol rate in excess of the symbol rate specified in the v.34 standard.

In one embodiment, modem 110 is built into computer system 100. In another embodiment, modem 110 exists independently from computer system 100.

Bypass modem 130 connects to central office switching system 140. Central office switching system 140 is a centralized telephone switching system, which connects to a plurality of subscriber loops that extend from central office switching system 140 to telephone line users. This includes private automatic branch exchanges (PABXs), as well as switching systems found within telephone companies.

Bypass modem 110 connects to subscriber loops 120, which carry electrical signals between bypass modem 110 and central office switching system 140. If central office switching system 140 is a PABX system, such as those found within businesses and hotels, subscriber loops 120 may consist entirely of wiring within a building. If central office switching system 140 is located at a telephone company, subscriber loops 120 extend from subscriber equipment to a telephone company switching system. Subscriber loops 120 connect to bypass modem 130, which switches subscriber loops 120 between central office switching system 140 and packet-switched network 170.

Central office switching system 140 also connects to public switched telephone network 150, which routes and carries telephone signals between a plurality of different central office switching systems.

Public switched telephone network 150 connects to network service provider 160. Network service provider 160 is any type of system providing network access to computer systems. This includes commercial on-line services such as America On-Line and CompuServe.

Bypass modem 130 also connects to packet-switched network 170. Packet-switched network 170 is any type of network which transfers digital data; it is not limited to networks using a packet-switched protocol. In one embodiment, packet-switched network 170 is the Internet. However, any other networks for transferring digital data may be used.

Packet-switched network 170 connects to network service provider 160, which provides facilities for connecting computer systems to packet-switched network 170, as well as other services used in conjunction with packet-switched network 170.

The system embodied in FIG. 1 operates in the following manner. Bypass modem 130 is usually transparent. For telephone users making or receiving ordinary voice calls, the system operates as if the bypass device were not present. When a data call is initiated, bypass modem 130 springs into action. In one embodiment, a call is first placed through central office switching system 140 and public switched telephone network 150 to network service provider 160. Upon receipt of identification information from computer system 100, network service provider 160 sends a data packet via packet-switched network 170 to activate bypass modem 130. Bypass modem 130 has an Internet protocol address, and network service provider 160 sends commands directly to this Internet protocol address through packet-switched network 170. Upon receipt of an activation command from packet-switched network 170, bypass modem 130 disconnects a subscriber loop from central office switching system 140 and establishes an alternate connection to network service provider 160 through packet-switched network 170.

In the active state, bypass modem 130 supplies all of the POTS functions normally provided from central office switching system 140 to subscriber loops 120. This includes battery feed, overvoltage, ringing injection, supervision, codec, hybrid and testing functions. During the bypass period, any incoming calls from central office switching system 140 to the subscriber loop receives either a ring-no-answer signal, or alternatively a busy signal.

According to another embodiment of the present invention, the control signal used to switch bypass modem 130 is activated by an electrical signal on a subscriber loop. In one embodiment, this control signal is encoded in the loop current status of the subscriber loop, and more specifically in the on/off hook status of the subscriber loop. In another embodiment, the control signal is encoded on a dual tone multiple frequency (DTMF) or pulse signal on a subscriber loop. Alternatively, any other ground start, loop start, or electromagnetic signaling method may be used. For example, in one embodiment the signal is encoded on autobaud modem signals as defined by CCITT Blue Book Series V or by CCITT v.34. In another embodiment, the signal is encoded on modem carrier tones, such as defined by ANSI T1.413. These include the 34.5 kHz initialization tone; the 69 kHz upstream pilot tone and the 276 kHz downstream pilot tone. In another embodiment, the signal on the subscriber loop takes the form of a digital message encoded on the subscriber loop.

According to another embodiment of the present invention, the control signal is activated by a signal which travels through central office switching system 140. This signal may originate from network service provider 160, or alternatively, it may originate from a portion of the telephone system, possibly public switched telephone network 150, or central office switching system 140.

In another embodiment, the control signal is activated by a signal from packet-switched network 170. In one embodiment this signal originates from network service provider 160. In another embodiment this signal originates from the telephone system. Alternatively, this signal may originate from any other source connected to packet-switched network 170.

In one embodiment the control signal for the switch is activated by a single hook switch flash (HSF). This embodiment operates as follows. The switch normally connects the subscriber loop to the voice network. In placing a voice call, the system operates as if the switch were not present. To activate the switch, the subscriber takes the line off hook, and then performs a short interruption of the loop current. Hook switch flash is defined as the following sequence: off hook, on hook, off hook. When the HSF is performed manually by a human, the initial off hook and on hook may vary in duration approximately between the limits of 40 msec minimum, to a maximum of 3 seconds. In another embodiment, which detects HSF signals from a computer, intervals of less than 30 msec are used. Another embodiment uses more than a single HSF to trigger a switching operation.

It is assumed that there are two types of subscriber loops; voice band and broad band. For the voice band subscriber loops, any interruption in the subscriber loop current causes the switch to return the subscriber loop to the voice network. For broad band subscriber loops, the switch ignores disconnect loop current status. Other embodiments use further disconnect methods, including internal timers, a ringing signal from the voice network, and other explicit disconnect signals sent through the subscriber loop and the data network.

In another embodiment, the switch is activated by control codes dialed into a subscriber loop. For example, when a subscriber dials an ordinary telephone call to network service provider 160, network service provider 160 activates bypass modem 130 by sending explicit commands to bypass modem 130.

In another embodiment, bypass modem 130 decodes the dialing signal on a subscriber loop and compares the number dialed with an internal table of numbers. If a match is found between the number dialed and a number stored in the table, the subscriber loop is switched from the voice to the data network. This number may be dialed in the form of a DTMF or pulse dialing signal. Bypass modem 130 monitors the off hook status of a subscriber loop. When the subscriber loop goes off hook, bypass modem 130 monitors what number is dialed into the subscriber loop and looks this number up in the table.

Figure 2:
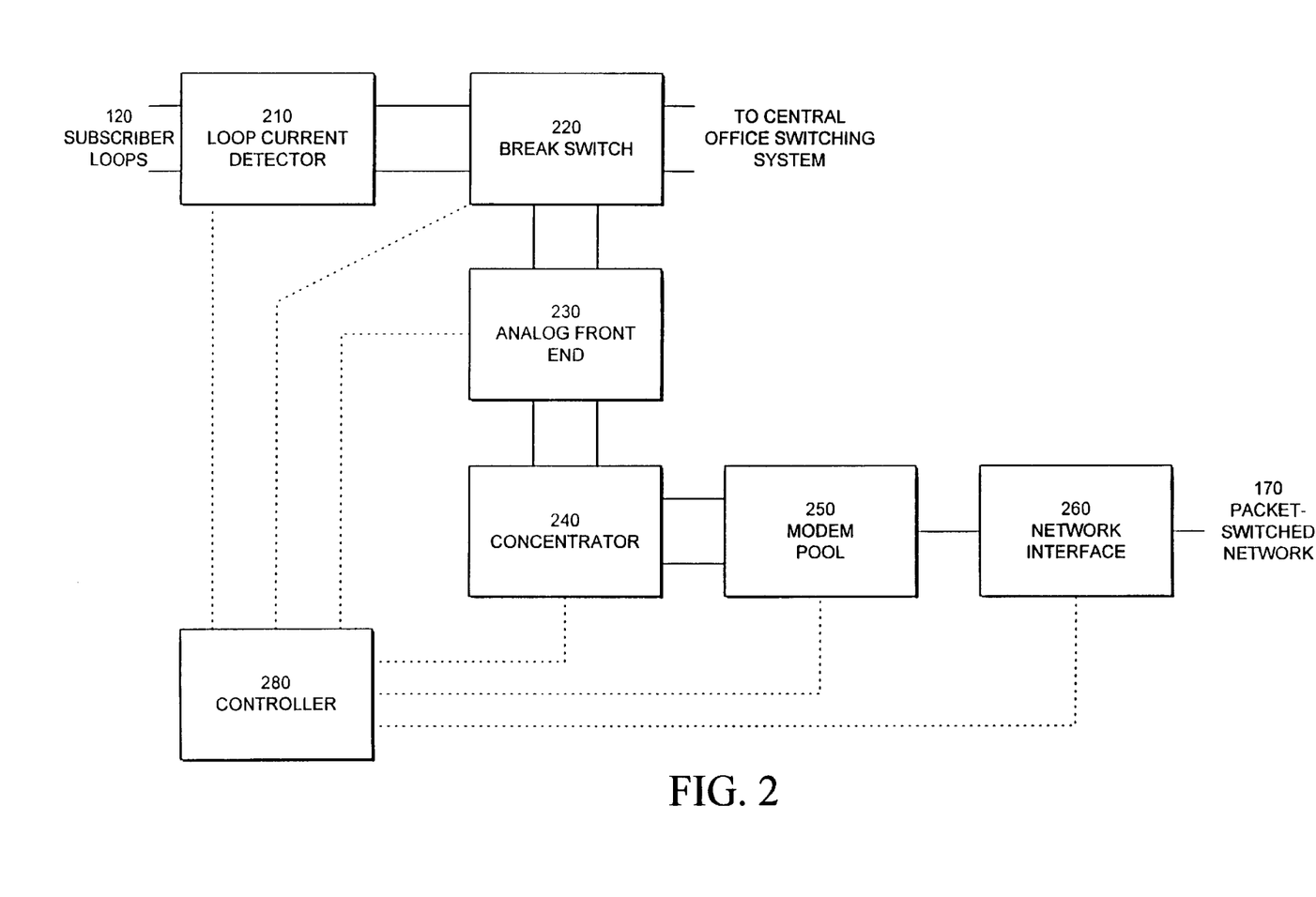
FIG. 2 is a block diagram illustrating the basic functional components of a system to switch subscriber loops 120 onto packet-switched network 170 in accordance with an aspect of the present invention.

FIG. 2 is a block diagram of the internal structure of bypass modem 130 (from FIG. 1) in accordance with an aspect of the present invention. Bypass modem 130 comprises the following elements: loop detector 210, break switch 220, analog front end 230, concentrator 240, modem pool 250, network interface 260 and controller 280.

Loop current detector 210 connects to subscriber loops 120 and break switch 220. Loop current detector 210 detects the loop current status, or other electrical signals, on subscriber loops 120. Electrical signals on subscriber loops 120 pass through loop current detector 210 into respective inputs in break switch 220.

Break switch 220 connects to central office switching system 140 (from FIG. 1) and to analog front end 230. Break switch 220 switches subscriber loops 120 between central office switching system 140 and packet-switched network 170 through analog front end 230.

Analog front end 230 provides battery, overvoltage, hybrid and supervision functions for subscriber loops 120. Analog front end 230 also connects to concentrator 240, and routes signals from break switch 220 into concentrator 240.

Concentrator 240 additionally connects modem pool 250. Concentrator 240 switches a plurality of signals from break switch a 220 into a plurality of modems within modem pool 250. In one embodiment, the number of inputs from break switch 220 is greater than the number of modems within modem pool 250. Concentrator 240 thereby performs a concentration function as well as a switching function.

Modem pool 250 connects to network interface 260. Modems within modem pool 250 takes signals from concentrator 240 and convert them into suitable format for transmission to network interface 260.

Network interface 260 connects to packet-switched network 170, and routes signals from modems within modem pool 250 to packet-switched network 170.

Controller 280 connects to loop current detector 210, break switch 220, analog front end 230, concentrator 240, modem pool 250 and network interface 260. Controller 280 coordinates the operation of loop current detector 210, break switch 220, analog front end 230, concentrator 240, modem pool 250 and network interface 260. In one embodiment, controller 280 includes a microprocessor, such as the Motorola 860, and uses the microprocessor's internal registers, timers and external dynamic RAM memory in performing the control functions.

This RAM memory contains various tables including: a table relating subscriber loops to one or more data network addresses such as switched virtual circuit addresses, permanent virtual circuit addresses, or IP addresses; a data structure for recording time since the last off hook condition was detected; a data structure for recording time since the last on hook condition was detected; a data structure for recording time since the ringing condition was detected; a data structure for recording dialed number sequences; a table relating subscriber loops to a list of dialed number sequences; a table for translating from dialed number sequences to network addresses; a table relating dialed number sequences to data network addresses, such as switched virtual circuit addresses, permanent virtual circuit addresses, or IP addresses; a data structure for recording cumulative activity per subscriber loop for accounting and billing purposes; a data structure for recording overall switch activity across all subscriber loops in order to collect traffic management statistics to determine utilization of the switch used and quality of service; a table relating subscriber loops to identification numbers; a table relating subscriber loops to one or more telephone numbers; and a table specifying allowable modem configurations, to control switching of subscriber loops by concentrator 240 to modems within modem pool 250.

In one embodiment, controller 280 includes a mechanism by which the various tables and data structures in the RAM memory can be modified and read from a remote location. In a variation on this embodiment, the modification and reading take place in response to data sent over packet-switched network 170.

Network interface 260 facilitates connections between modems in modem pool 250 and packet-switched network 170. In one embodiment, network interface 260 includes a Motorola 860 microprocessor and an Ethernet interface.

Figure 3:
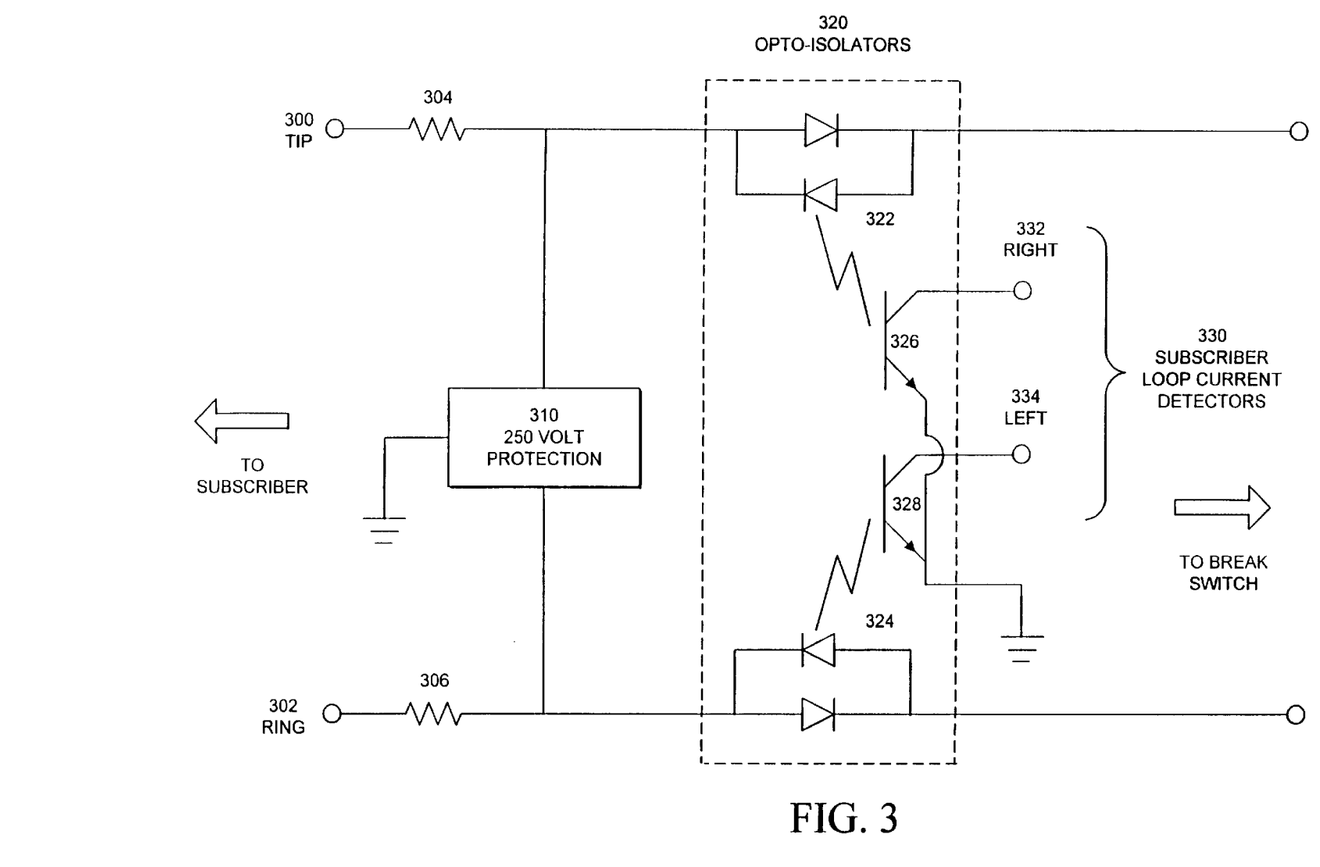
FIG. 3 is a circuit diagram of loop current detector 210 (from FIG. 2), for detecting current on a subscriber loop within subscriber loops 120 in accordance with an aspect of the present invention.

FIG. 3 is a circuit diagram of an embodiment of loop current detector 210 (from FIG. 2) FIG. 3 illustrates the circuitry for a single subscriber loop within subscriber loops 120. The subscriber loop consists of two lines; subscriber tip 300 and subscriber ring 302. Subscriber tip 300 passes through resistor 304 and feeds into opto-isolator 322 as well as 250 volt protection 310. Subscriber ring 302 passes through resistor 306 and feeds into opto-isolator 324 as well as 250 volt protection 310. 250 volt protection 310 additionally connects to ground. Another terminal of opto-isolator 322 feeds into a respective input in break switch 220 (from FIG. 2). Similarly, another terminal of opto-isolator 324 feeds into a respective input within break switch 220. Opto-isolator 322 includes switching transistor 326 which connects an output "right" 322 to ground. Opto-isolator 324 includes switching transistor 328 which connects an output "left" 334 to ground.

Opto-isolators 322 and 324 consist of an LED and a transistor encased in a single package. One of the opto-isolators 322 and 324 indicates when current flows in one direction, and the other opto-isolator indicates when current flows in the opposite direction. Opto-isolators 322 and 324 are placed symmetrically in each path of the subscriber loop. In each case, the opto-isolator LEDs are bypassed with reverse diodes. All of the diodes have matched characteristics to maintain longitudinal balance in the subscriber loop.

Loop current detector 210 operates as follows. When current flows from subscriber tip 300 to subscriber ring 302 it passes through the top diode of opto-isolator 322 and into break switch 220. After passing through break switch 220, the current flows through the top diode of opto-isolator 324 causing transistor 328 to be switched on. This creates a connection between the left signal line 334 and ground. When current flows the opposite direction, from subscriber ring 302 to subscriber tip 300, it passes through the lower diode of opto-isolator 324 and into break switch 220. After passing break switch 220, the current flows through the lower diode of opto-isolator 322 where it activates transistor 326, causing a connection between right signal line 332 and ground. When no current flows through the subscriber loop, neither signal line right 332 nor signal line left 334 is connected to ground. Circuitry within 250 volt protection 310 protects the circuitry of the bypass modem 130 from voltage spikes on the subscriber line.

In one embodiment, loop current detector 210 contains a DTMF detector, such as Silicon Systems part number 75T204, bridged between tip 300 and ring 302 for detecting DTMF signals on the subscriber loop.

Loop current detector 210 detects periods of zero current on the subscriber loop. Switching of the subscriber loop is ideally performed during these periods of zero current. This is known as dry switching. Dry switching has a number of advantages: it allows smaller, cheaper switching elements to be used to perform the switching; the switching elements work more reliably; and emissions from the switching elements are reduced.

Figure 4:
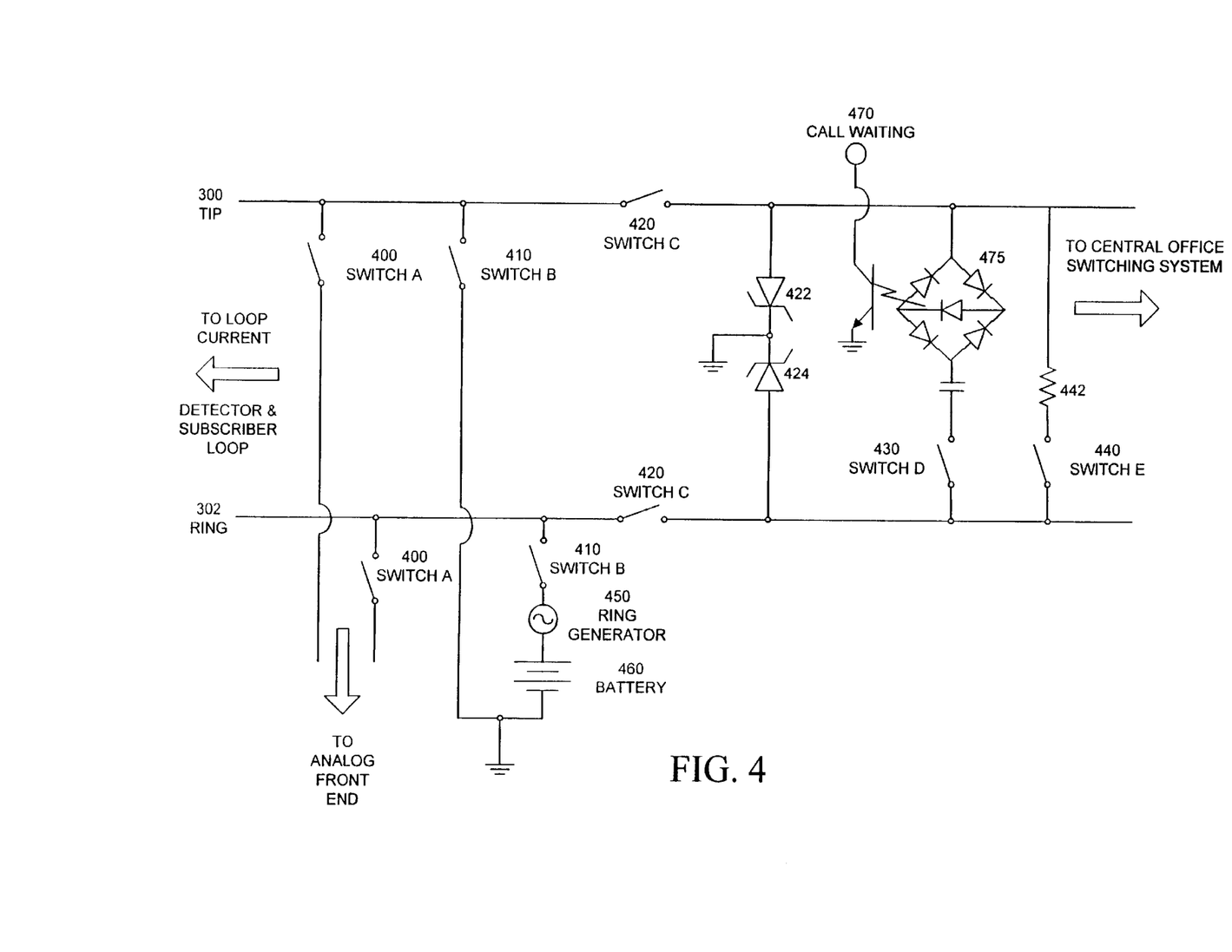
FIG. 4 is a circuit diagram of break switch 220 (from FIG. 2), including circuitry for ring generation and for detecting incoming calls from the central office switching system 140 in accordance with an aspect of the present invention.

FIG. 4 is a circuit diagram of an embodiment of break switch 220 in accordance with an aspect of the present invention. The circuit in FIG. 4 comprises the circuitry for a single subscriber loop within the plurality of subscriber loops connecting to break switch 220. The circuit takes in a "tip" signal line 300 and a "ring" signal line 302 from loop current detector 210 on the left hand side of FIG. 4. These signal lines connect through switch A 400 to analog front end 230 (from FIG. 2). Note that switch A 400 comprises a pair of switches, one connecting to the tip signal 300, and the other connecting to the ring signal 302. The signal lines additionally connect to ring generator 450 through switch B 410, which also comprises a pair of switches, one for the tip signal 300 and the other for the ring signal 302.

Switch C 420 comprises a pair of switches which are used to disconnect the subscriber loop from its normal connection to the central office switching system 140.

In one embodiment, switch C 420 is a solid state relay such as the AT&T L7583. The line break switch pair is a transmission switch with matched "on" resistances. The switching elements maintain subscriber loop frequency characteristics in the "on" state and are able to withstand ordinary telephone signaling voltages such as talk battery and ringing. The switch also protects against various fault conditions such as lightening induced surges and power line cross.

After passing through switch C 420, tip signal 300 connects through Zener diode 422 to ground. After passing through switch C 420, ring signal 300 connects through Zener diode 424 to ground. Ring signal 302 additionally passes through switch D 430 to ringing detector circuit 475. Ring signal 302 also passes through switch E 440 and resistor 422 before connecting to the tip signal 300.

The circuitry in FIG. 4 operates as follows. Normally, only one of switches A 400, B 410 or C 420 can be connected at any one time. When switch A 400 is connected, the subscriber loop is connected to analog front end 230, which establishes a connection to packet-switched network 170. When switch B 410 is connected, the subscriber loop is connected to ring generator 450 and battery 460, which generates a ringing signal on the subscriber loop. When switch C 420 is connected, the subscriber loop is connected to central office switching system 140.

Zener diodes 422 and 424 provide voltage protection on the line to the central office switching system 140.

Switch D 430 is normally closed when break switch C 420 is open. Switch D 430 activates ringing detector circuit 475, which is used to detect an incoming call from central office switching system 140. One embodiment of the ringing detector circuit (illustrated in FIG. 4) is a capacitor in series with a full wave bridge driving an LED which activates a transistor output during ringing. When an incoming call is detected, call waiting signal 470 connects to ground.

In another embodiment, switches A 400 and C 420 are closed at the same time, thereby allowing modems within modem pool 250 to monitor DTMF dialing signals on subscriber loops 120. In a variation on this embodiment, modems within modem pool 250 include digital signal processors, and these digital signal processors monitor the DTMF signals.

In another embodiment, switches A 400 and C 420 are closed at the same time, thereby allowing modems within modem pool 250 to monitor voice band autobaud signals. In a variation on this embodiment, modems within modem pool 250 include digital signal processors, and these digital signal processors monitor the voice band autobaud signals.

In another embodiment, switches A 400 and C 420 are closed at the same time, thereby allowing modems within modem pool 250 to monitor broadband tones, such as 34.5 kHz, or other high frequency signals. In a variation on this embodiment, modems within modem pool 250 include digital signal processors, and these digital signal processors monitor the broadband tones and other high frequency signals.

In another embodiment ringing detection circuitry 475 additionally includes circuitry to report the ringing condition of the voice network to the subscriber loop when the subscriber is connected to the data network. In one embodiment, this reporting function is accomplished through controller 280 (from FIG. 2). In another embodiment, this reporting function is accomplished through dedicated circuitry to report the ringing condition to the subscriber loop.

Switch E 440 is normally connected when break switch C 420 is disconnected. Switch E 440 is an alternative to switch D 430. When switch E 440 is connected, a busy signal is transmitted to central office switching system 140. In this way, an incoming call may either be detected as a call waiting, or alternatively a busy signal can be sent to the incoming caller to indicate that the subscriber loop is busy.

According to another embodiment of the present invention, break switch 220 includes a system to deactivate the bypass switch so that a data connection can be terminated and returned to the voice network when an incoming call from the voice network is detected. This function is useful for responding to various automatic devices such as facsimile machines.

Figure 5:
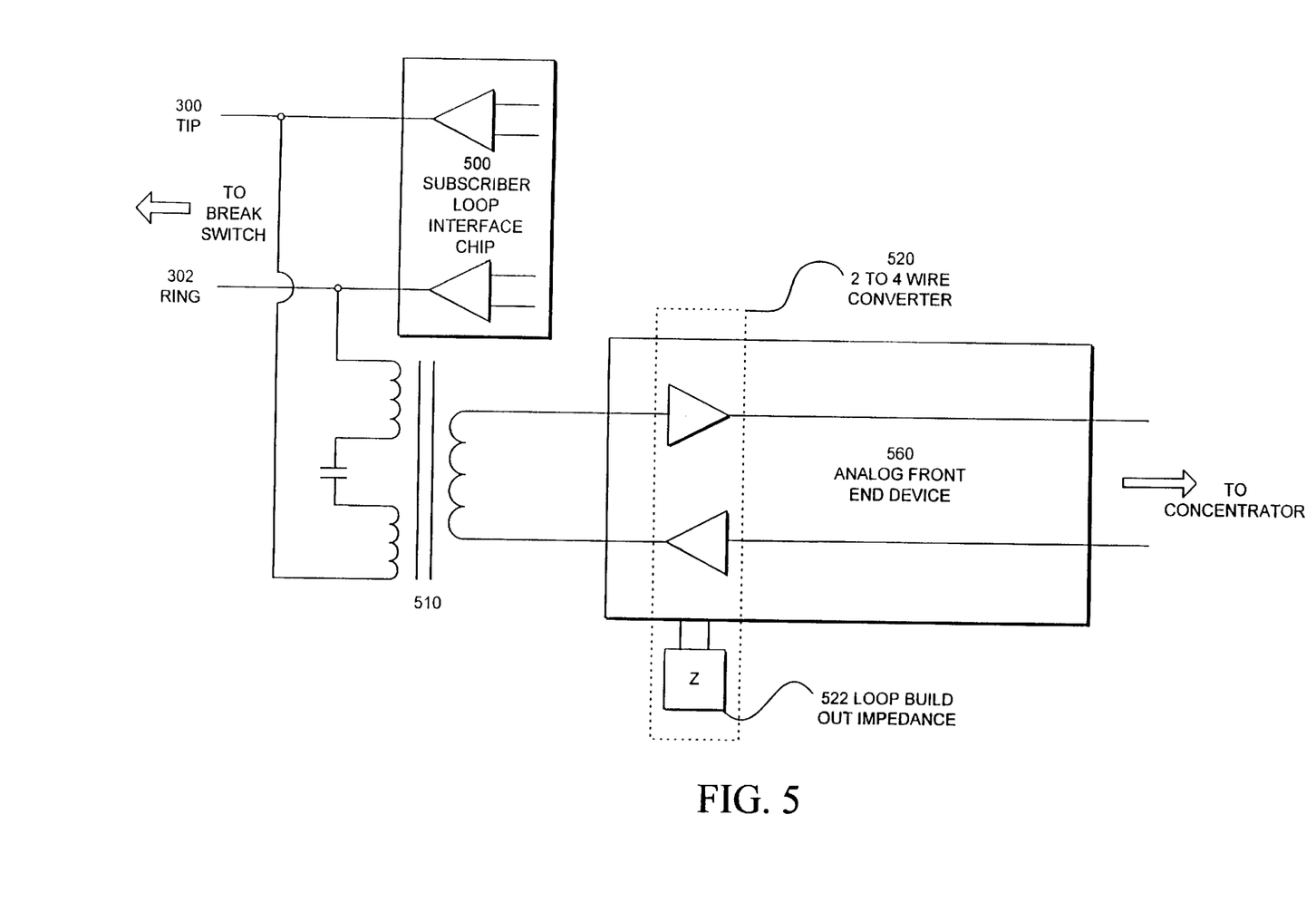
FIG. 5 is a circuit diagram of analog front end 230 (from FIG. 2), including subscriber loop interface circuitry and analog to digital converters in accordance with an aspect of the present invention.

FIG. 5 illustrates the internal circuitry of analog front end 230 (from FIG. 2). Tip signal 300 and ring signal 302 from break switch 220 feed into the left hand side of the circuitry. These signals connect to subscriber loop interface 500 which provides battery current to the subscriber loop when the subscriber loop is disconnected from central office switching system 140. The subscriber loop also feeds through transformer 510 into an analog front end device 560 (such as the Motorola CopperGold AFE chip) which performs 2–4 wire conversion. Analog front end device 560 includes 2-to-4 wire converter 520, which includes loop build out impedance 522.

Analog front end 230 converts a 2-wire analog signal on a subscriber loop into a 4-wire digital signal. Two of the four wires comprise a transmit channel; the other two wires comprise a receive channel. The four wire analog signal is sent to concentrator 240 from the right hand side of FIG. 5. In another embodiment, analog front end 230 includes circuitry for analog-to-digital and digital-to-analog conversion for a digital concentrator, such as a time-division multiplexed bus.

Figure 6:
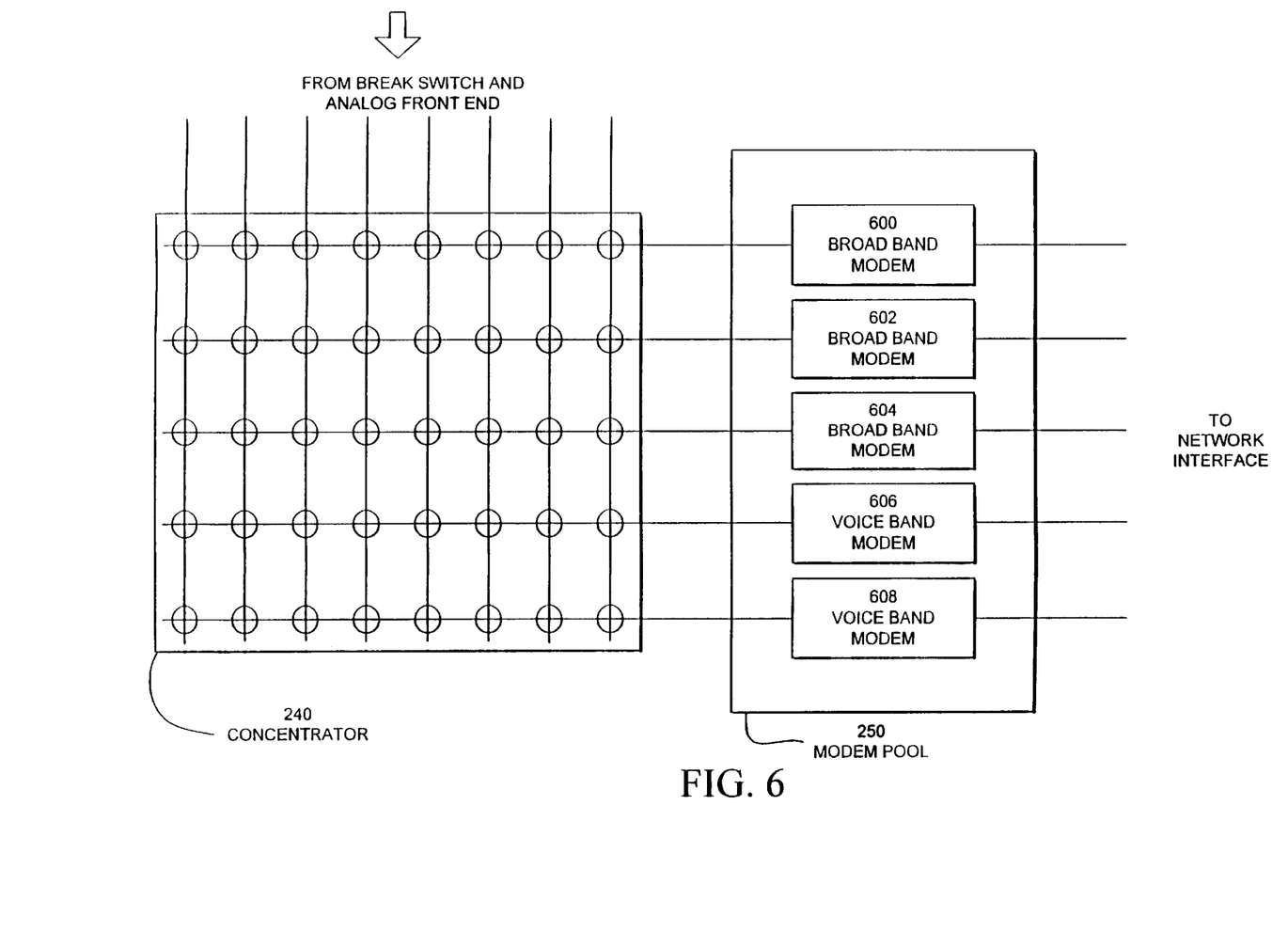
FIG. 6 illustrates the interior structure of concentrator 240 and modem pool 250 (from FIG. 2) in accordance with an aspect of the present invention.

FIG. 6 illustrates the internal structure of concentrator 240 and modem pool 250 in accordance with an aspect of the present invention. Concentrator 240 takes inputs from break switch 220 through analog front end 230 and connects them onto modems within modem pool 250. These modems connect to network interface 260 on the right hand side of FIG. 6.

Concentrator 240 performs 2 functions. First, it performs a concentration function, allowing a small pool of modems to service a larger number of subscriber loops. The cost per subscriber of the modem equipment is thereby reduced by the ratio of subscribers to modems. For example, if only one modem is needed to support two subscribers, the cost of the modem to the subscriber is reduced by half. Obviously, modem usage patterns must be such that the cost of the switch per subscriber is significantly lower than the cost of a modem. Second, concentrator 240 makes it possible to connect a variety of different modem types to each subscriber loop. For example, a subscriber line can be switched from a 300 baud modem to an 8 Mbit/second ADSL modem with no reconfiguration of modem pool 250.

The optimal design for concentrator 240 and modem pool 250 depends on statistical usage patterns of subscribers on subscriber loops. The simplest architecture for concentrator 240 is an X-Y 2-wire cross point switch constructed out of solid state switches, such as the AT&T LH 1514 high-frequency solid-state relay. These switches pass signals from DC to 1 MHz, or higher. One advantage of a cross point switch is that no interface circuitry is required, such as 2 to 4 wire converters. The subscriber loops can be directly connected to the switch. However, the cost of a cross point switch increases as the product of the number of subscribers and the number of modems. Consequently, cross point switches are impractical for large numbers of subscribers and modems.

Another embodiment of concentrator 240 uses four wire switching, where the transmit and receive paths are separated before entering the switch. Some four wire switches increase in cost linearly, as the sum of the number of subscribers and modems. For example, a 4-wire switch which uses heterodyne frequency division multiplexing to accomplish the switching function, only increases in cost as the sum of the number of subscribers and modems.

Alternatively, many switching mechanisms are known in the prior art, including both 2-wire and 4-wire switches operating in time, space, frequency, code, or phase domains.

Modem pool 250 includes broad band modems 600, 602 and 604, and voice band modems 606 and 608. Subscriber loops are directly coupled to either a broad band modem or a voice band modem through concentrator 240. In one embodiment, modems 600, 602, 604, 606 and 608 comprise processors running modem software. In a variation on this embodiment, modems within modem pool 250 are implemented with digital signal processors, such as the Texas Instruments C6x. In another embodiment, modems within modem pool 250 are implemented as dedicated chips, such as the Motorola ADSL transceiver. In yet another embodiment, modems within modem pool 250 are implemented as a combination of the above-mentioned devices.

The foregoing description of an embodiment of the present invention has been presented for purposes of illustration and description only. It is not intended to be exhaustive or to limit the invention to the forms disclosed. Obviously many modifications and variations will be apparent to practitioners skilled in the art.

What is claimed is:

1. In a system comprising a subscriber loop, a packet-switched network, a central office switching system, and a bypass modem coupled to the subscriber loop, the packet-switched network and the central office switching system, a method for switching the subscriber loop between the central office switching system and the packet-switched network, comprising:

establishing a connection between the subscriber loop and the bypass modem;

coupling the subscriber loop to the central office switching system through the bypass modem;

receiving a control signal at the bypass modem to switch the subscriber loop to the packet-switched network; and switching the subscriber loop in response to the control signal to the packet-switched network from the central office switching system through the bypass modem.

2. The method claim 1, wherein the control signal is generated in response to a signal received through the subscriber loop.

3. The method of claim 2, wherein the control signal is generated in response to a signal encoded in a direct current of the subscriber loop.

4. The method of claim 3, wherein the control signal is generated in response to a signal encoded in changes in an on/off hook direct current status of the subscriber loop.

5. The method of claim 2, wherein the control signal is generated in response to a signal received through a telephone number dialed on the subscriber loop.

6. The method of claim 2, wherein the control signal is generated in response to a signal received through a DTMF signal on the subscriber loop.

7. The method of claim 2, wherein the control signal is generated in response to a signal received through an electromagnetic signal on the subscriber loop.

8. The method of claim 2, wherein the control signal is generated in response to a signal received through an autobaud modem signal on the subscriber loop.

9. The method of claim 2, wherein the control signal is generated in response to a signal received through a modem carrier signal on the subscriber loop.

10. The method of claim 2, wherein the control signal is generated in response to a signal received through a digital message encoded on the subscriber loop.

11. The method of claim 1, wherein the control signal is generated in response to a signal received through the packet-switched network.

12. The method of claim 1, wherein the control signal is generated in response to a signal received through the central office switching system.

13. The method of claim 1, wherein the switching occurs during a period of substantially zero current on the subscriber loop.

14. The method of claim 1, wherein the packet-switched network comprises the Internet.

15. In a system comprising, a central office switching system coupled to a packet-switched network and a circuit switched network, a subscriber loop coupled to the central office switching system and a remote host, the remote host coupled to the packet-switched network and the circuit switched network, a method for establishing a connection between the subscriber loop and the remote host through the packet-switched network, comprising:

establishing a connection between the subscriber loop and the remote host through the circuit switched network;

receiving a command to switch the connection to the packet-switched network; and establishing in response to the command a connection between the subscriber loop and the remote host through the packet-switched network and releasing the connection between the subscriber loop and the remote host through the circuit switched network.

16. The method of claim 15, wherein the command to switch the connection is received through the packet-switched network.

17. The method of claim 15, wherein the command to switch the connection is received through the subscriber loop.

18. The method of claim 15, wherein the command to switch the connection is received through the circuit switched network.

19. The method of claim 15, wherein the command to switch the connection is generated by the remote host.

20. The method of claim 15, wherein the command to switch the connection is generated by the central office switching system.

21. The method of claim 15, wherein the command to switch the connection is generated by a computer system coupled to the subscriber loop.

22. The method claim 15, wherein the command to switch the connection is generated by a person using the subscriber loop.

23. The method of claim 15, wherein the packet-switched network comprises the Internet.

24. The method of claim 15, wherein the switching of the subscriber loop takes place at a switch which is independent from the central office switching system.

25. The method of claim 15, wherein the switching of the subscriber loop takes place at the central office switching system.

* * * * *